(12) United States Patent
Thomson et al.

(10) Patent No.: US 10,476,831 B2
(45) Date of Patent: *Nov. 12, 2019

(54) SYSTEM AND METHODS FOR PROVIDING A NOTIFICATION UPON THE OCCURRENCE OF A TRIGGER EVENT ASSOCIATED WITH PLAYING MEDIA CONTENT OVER A NETWORK

(71) Applicant: Campus Crusade For Christ, Inc., Los Angeles, CA (US)

(72) Inventors: Aaron Thomson, Orlando, FL (US); Howard Crutsinger, Orlando, FL (US); Tataihono Rauru Nikora, Remuera (NZ); Eric Barker, Baltimore, OH (US); Matthew Watts, Orlando, FL (US)

(73) Assignee: Campus Crusade For Christ, Inc., Los Angeles, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/205,530

(22) Filed: Jul. 8, 2016

(65) Prior Publication Data
US 2017/0012921 A1    Jan. 12, 2017

Related U.S. Application Data

(60) Provisional application No. 62/190,087, filed on Jul. 8, 2015, provisional application No. 62/190,965, filed on Jul. 10, 2015.

(51) Int. Cl.
*H04L 12/58* (2006.01)
*H04L 29/08* (2006.01)
*H04W 4/21* (2018.01)
*H04L 29/06* (2006.01)

(52) U.S. Cl.
CPC .............. *H04L 51/24* (2013.01); *H04L 67/02* (2013.01); *H04L 67/24* (2013.01); *H04L 67/42* (2013.01); *H04W 4/21* (2018.02)

(58) Field of Classification Search
CPC ......... H04L 67/42; H04L 51/14; H04L 67/02; H04L 67/22; H04L 67/26; G06Q 50/01; G06Q 30/0251
See application file for complete search history.

(56) References Cited

U.S. PATENT DOCUMENTS

| | | |
|---|---|---|
| 6,850,965 B2 | 2/2005 | Allen |
| 9,607,309 B2 | 3/2017 | Kumar et al. |
| 2004/0070600 A1 | 4/2004 | Morrisroe et al. |
| 2005/0256768 A1 | 11/2005 | Robinson |
| 2006/0212352 A1 | 9/2006 | Avissar |
| 2007/0271137 A1 | 11/2007 | Vezza et al. |
| 2007/0271138 A1 | 11/2007 | Van Der Linden et al. |

(Continued)

*Primary Examiner* — Hitesh Patel
(74) *Attorney, Agent, or Firm* — Christopher M. Ramsey; GrayRobinson, P.A.

(57) ABSTRACT

Systems and methods for providing a notification upon the occurrence of a trigger event associated with playing media content over a network are described. An exemplary method may include transmitting access to a media content data file to a computing device associated with a content receiver, playing the data file at the computing device, and transmitting an electronic notification to another computing device when the trigger event occurs.

6 Claims, 5 Drawing Sheets

(56) References Cited

U.S. PATENT DOCUMENTS

| | | | |
|---|---|---|---|
| 2011/0113122 A1* | 5/2011 | Drope | G06F 21/10 |
| | | | 709/219 |
| 2011/0219403 A1 | 9/2011 | Nesamoney et al. | |
| 2012/0011196 A1 | 1/2012 | Green et al. | |
| 2013/0103814 A1* | 4/2013 | Carrasco | H04L 65/4015 |
| | | | 709/223 |
| 2014/0025484 A1 | 1/2014 | Altberg et al. | |
| 2014/0188997 A1* | 7/2014 | Schneiderman | H04L 51/32 |
| | | | 709/204 |
| 2014/0222551 A1 | 8/2014 | Jain et al. | |
| 2014/0297362 A1 | 10/2014 | Kumar | |
| 2015/0199122 A1* | 7/2015 | Garmark | H04L 67/42 |
| | | | 715/716 |
| 2016/0234553 A1* | 8/2016 | Hampson | H04N 21/458 |
| 2019/0075130 A1* | 3/2019 | Petry | H04L 45/306 |

* cited by examiner

SYSTEM AND METHODS FOR PROVIDING A NOTIFICATION UPON THE OCCURRENCE OF A TRIGGER EVENT ASSOCIATED WITH PLAYING MEDIA CONTENT OVER A NETWORK

CROSS-REFERENCE TO RELATED APPLICATIONS

This claims the benefit of provisional Application No. 62/190,087, filed Jul. 8, 2015, and provisional Application No. 62/190,965, filed Jul. 10, 2015. The entire contents of these prior applications are hereby incorporated by reference.

BACKGROUND

Modern technology provides people many ways to communicate. People can now use mobile phones to simultaneously browse the Internet, make phone calls, and transmit messages. Such technology provides enormous opportunity to communicate with people in many different formats wherever they are located.

Individuals and organizations use the Internet to reach people through their respective websites, SMS or MMS messages, and emails. They might provide audio or video content designed to promote a message, advertise goods and services, or provide useful information on a topic. The recipients might, in turn, embed the content into an email, a social media post, or an SMS message to distribute it to others who might also be interested in receiving it.

Current content sharing platforms lack the capability of informing the sender whether a recipient is in the process of viewing the shared content or when the recipient has just finished viewing the shared content. Conventional email and SMS messaging platforms simply notify a sender when a particular message is received or read by a recipient.

In Internet applications, there are chat functions that allow a representative of a website to initiate a chat with a user of the website by posting a question such as "May I help you" on the website. In these chat functions, the sender provides a message and waits for a response from the recipient. These chat functions do not inform the sender about the stage of interaction with the message or website by the recipient.

SUMMARY

In view of the foregoing, it would be advantageous to have a computer-implemented system that provides a notification to a sender upon the occurrence of a trigger event associated with playing media content over a network by a receiver. The notification will allow the sender to electronically communicate with the receiver at the most impactful time: when the receiver is playing the content or has just finished playing the content.

Such a computer system provides a notification upon the occurrence of a trigger event associated with playing media content over a network. The computer system has non-transitory memory storing computer program instructions and at least one processor configured to execute the computer program instructions to:
  (a) receive, by a server, a request from a first computing device associated with a content sender, the request identifying contact information for a content receiver and a media content data file having trigger event associated therewith;
  (b) transmit, by the server over the network, access to the media content data file to a second computing device associated with the content receiver;
  (c) play, over the network, the media content data file at the second computing device; and
  (d) transmit an electronic notification, by the server over the network, to the first computing device when the trigger event occurs, the electronic notification being displayed at the first computing device and notifying the content sender of the occurrence of the trigger event.

A computer-implemented method also provides a notification upon the occurrence of a trigger event associated with playing media content over a network, the method includes:
  (a) receiving, by a server, a request from a first computing device associated with a content sender, the request identifying contact information for a content receiver and a media content data file having a trigger event associated therewith;
  (b) transmitting, by the server over the network, access to the media content data file to a second computing device associated with the content receiver;
  (c) playing, over the network, the media content data file at the second computing device; and
  (d) transmitting an electronic notification, by the server over the network, to the first computing device when the trigger event occurs, the electronic notification being displayed at the first computing device and notifying the content sender of the occurrence of the trigger event.

A server for providing a notification upon the occurrence of a trigger event associated with playing media content over a network has non-transitory memory storing computer program instructions and at least one processor configured to execute the computer program instructions to:
  (a) receive, by a server, a request from a first computing device associated with a content sender, the request identifying contact information for a content receiver and a media content data file having a trigger event associated therewith;
  (b) transmit, by the server over the network, access to the media content data file to a second computing device associated with the content receiver;
  (c) play, by the server over the network, the media content data file at the second computing device; and
  (d) transmit an electronic notification, by the server over the network, to the first computing device when the trigger event occurs, the electronic notification being displayed at the first computing device and notifying the content sender of the occurrence of the trigger event.

DETAILED DESCRIPTION OF EXAMPLE EMBODIMENTS

This disclosure describes example embodiments, but not all possible embodiments of the systems and methods. Where a particular feature is disclosed in the context of a particular embodiment, that feature can also be used, to the extent possible, in combination with and/or in the context of other embodiments. The systems and methods may be embodied in many different forms and should not be construed as limited to only the embodiments described here.

Figure 1:
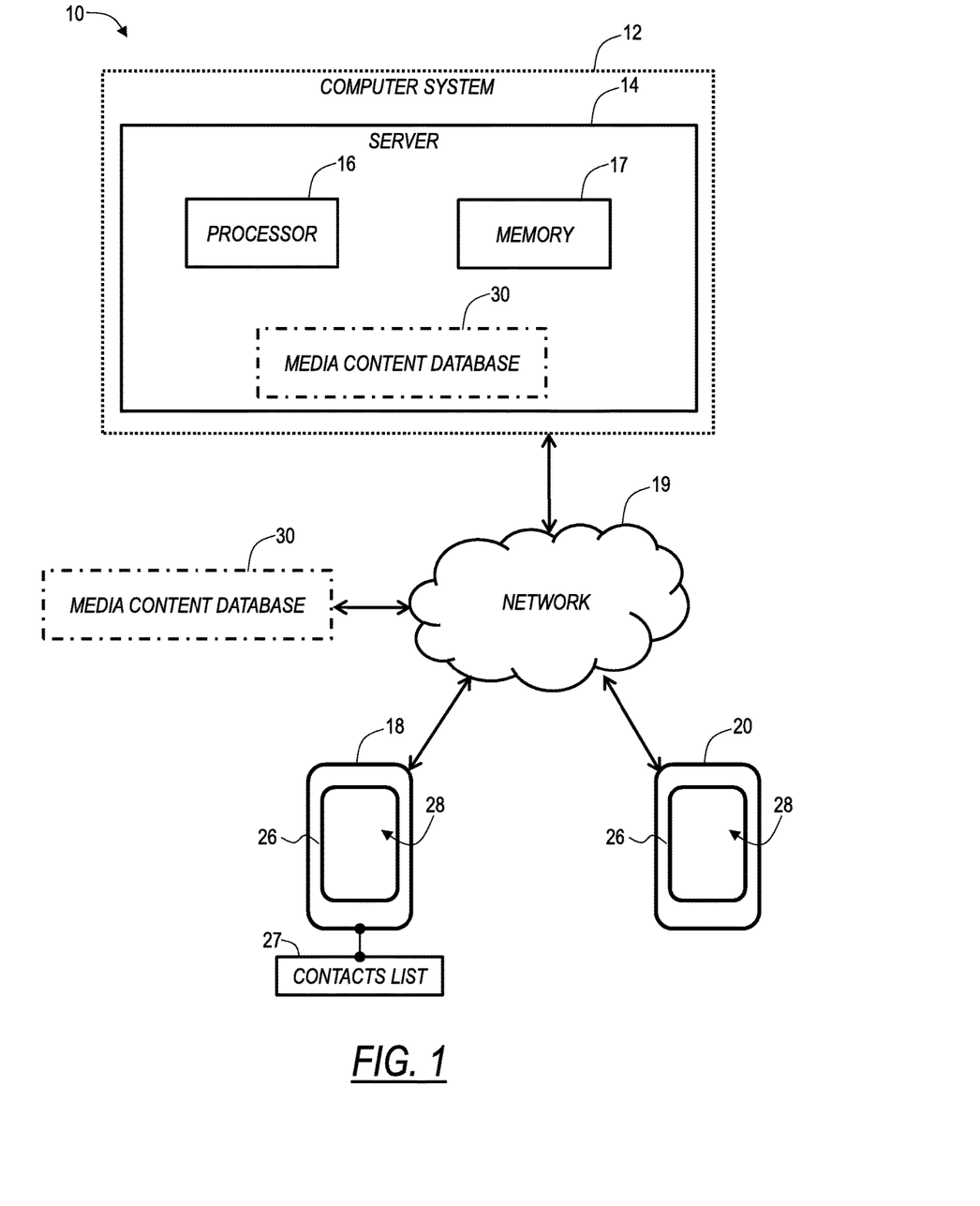
FIG. 1 is a block diagram of an exemplary computer system for providing a notification upon the occurrence of a trigger event associated with playing media content over a network.

FIG. 1 illustrates an exemplary system for providing a notification upon the occurrence of a trigger event associated with playing media content over a network. The system 10 includes a computer system 12 with a server 14 having at least one processor 16 and non-transitory machine readable memory 17 storing program instructions. The processor 16 implements the computer program instructions to facilitate communications between a content sender computing device 18 and a content receiver computing device 20. The computer system 12 communicates with the computing devices 18, 20 through a network 19, such as the Internet.

The computer system 12 is not limited to any particular number, type, or configuration of processors 16, nor to any particular programming language, memory storage format or memory storage medium 17. The computer system 12 may include multiple processors 16 and/or machine readable memory 17 storage media.

The computer system 12 is not necessarily limited to any particular language, geographic location, or networking or connection of the processors 16 and/or machine readable memory 17 storage media, provided that the processors 16 and/or machine readable memory 17 storage media are able to cooperate to execute the disclosed functions. Further, it is not necessarily required for the processors 16 and/or machine readable memory 17 storage media be commonly owned or controlled.

The computing devices 18, 20 are configured to allow the content sender and content receiver to communicate with each other through the network 19. The computing devices 18, 20 can execute an interface 26 that may take the form of a website, an application program interface (API), a graphical user interface, or the like. The interface 26 is displayed on a screen 28 of the computing device 18, 20.

The computing devices 18, 20 are electronic devices that can connect to the network 19. Examples include, but are not limited to, desktop computers, laptop computers, tablets, mobile devices, and mobile phones such as smart phones.

Communications between the computing devices 18, 20 may be in the form of email, SMS messaging, MMS messaging, or the like. The system 10 may transmit different types of media content data file formats such as text, audio, video, audiovisual, and combinations thereof.

A media content database 30 stores media content data files such as audio files, video files, text files, audiovisual files, character emoticons, or the like. The media content database 30 may be on the server 14 and/or on a third party's server. This is why the media content database 30 is shown in broken lines and in two different locations in FIG. 1.

As an alternative to storing the data files themselves, the media content database 30 may store internet URL links to where particular media files are located. Accordingly, the media content database 30 may be controlled by another party and may be accessible through that party's website. Websites, such as YOU TUBE, VIMEO, and others that provide online video and/or audio content may provide the access to the media content database 30. In at least one embodiment, a media content data file may be selected by a user where the user enters the link or URL of the media content data file to be shared.

The media content data files have an associated trigger event that the computer system 12 detects. This trigger event may have many different forms, including, a change in the play status of the data file. The play status may change when, for example, the playing of the file is started, paused, or completed. The particular trigger event associated with a data file is defined in the program instructions on the memory 17.

In some examples, the trigger event may be a time component associated with the time period over which the data file will play from start to finish. The trigger event may be an amount of time passed since the media content data file was displayed at the content receiver computer device 20, a particular time position in the media content data file, a preselected portion of completion of playing the data file, content at a particular place in the data file, completion of playing data file, the point in time where the data file is stopped playing without being completely finished playing, and/or a combination thereof.

When the trigger event occurs, the computer system 12 sends a notification to the content sender's computing device and displays it on the screen 28. This message prompts the content sender to send a message to the content receiver at the content receiver computing device 20.

Audio and video files, for example, will play over a set time period from the beginning of the file to the end of the file. The trigger event may be associated with the playing time of the audio or video file, when the content receiver presses the play button, or when playing the file stops.

When the computer system 12 knows the playing time of a media content data file, the trigger event may be a predetermined time within that file. By way of example, if a video file will play for three minutes, the trigger event may be set as any time during those three minutes. In such a case, the trigger event will occur when the file reaches the selected point in time. In particular examples each media content data file will have an associated time component. The system 12 can store a time setting for each media content data file and use the stored time setting function as the trigger event.

In the alternative, the computer system 12 may store a generic time setting to serve as the trigger event. For example, the trigger event may be a percentage of the total time the media content file will play. If the time setting is set to 80% for example, the trigger event will occur when 80% of the playing time of the media content is met.

When the trigger event is a pre-defined time setting. A timer may be in communication with the processor 16 to determine the amount of time that has passed since the data file was displayed at the content receiver computing device 20.

After the trigger event has occurred, the computer system 12, displays a notification at the content sender computing device 18. The notification may indicate in real-time that the content receiver accessed the media content, whether the media content is currently playing, if the media content is almost finished playing, and/or if the media content has already finished playing. The content sender may use the notification to decide when to send a text message to the content receiver at the content receiver computing device 20. If the sender has multiple computing devices 18, the system 12 may transmit the notification to each of those devices if the contact information for each device is stored in the memory 17.

Certain program functions of the computer system 12 will now be described with reference to FIGS. 2-4. The computer program instructions are stored on the memory 17. The processor 16 executes the computer program instructions.

Figure 2:
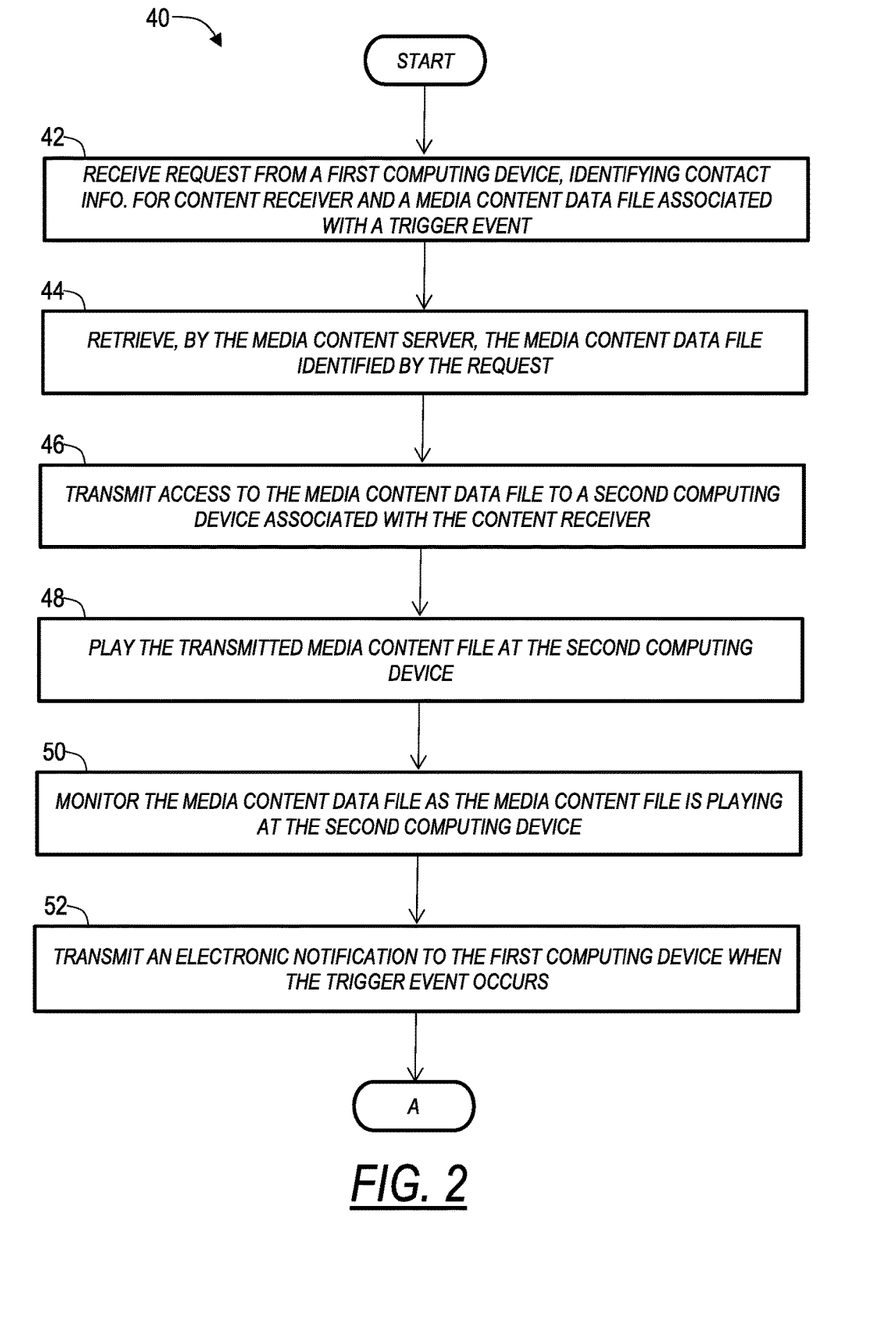
FIG. 2 is a flow diagram illustrating an exemplary method for providing a notification upon the occurrence of a trigger event associated with playing media content over a network.

FIG. 2 is a flowchart of an exemplary computer-implemented method 40 for providing the notification upon the occurrence of the trigger event associated with playing media content over the network. The steps in this method may be performed by the computer system 12 and/or server 14 over the network 19.

At block 42, the server 14 receives a request from the first computing device, which may be the content sender's computing device 18. The request identifies contact information for the content receiver and a media content data file. The contact information for the content receiver includes information to allow the server 14 to contact the receiver electronically. Such contact information may be, for example, a phone number, email address, messaging address associated with a social media account, or the like. The contact information may be stored in a contacts list 27 of the content sender's computing device 18.

At block 44, the server 14 accesses, via the processor 16, the media content database 30 and retrieves the media content data file identified in the request. The media content data file may be identified by the server 14 according to a conventional file location scheme, such as a file name or the like. If the media content data file is stored on a third party server, the media content data file may be retrieved by identifying the URL where the file is located. When retrieving the data file, the server 14 identifies the data file as the one requested. The server 14 may associate the request, data file, content sender, and content receiver with a unique token associated with the request and subsequent interactions between the content sender and receiver.

At block 46, the server 14 transmits, over the network 19, access to the requested and retrieved media content data file to the content receiver's computing device 20. The media content data file may remain stored on the media content database 30. In such a case, the server transmits an Internet URL to the content receiver's computing device 20. The Internet URL links to a webpage that can display and play the media content data file. If the data file is stored on a third party server, the data file may be embedded in the webpage. Accordingly, the server 14 is capable of transmitting the data file without physically sending a copy of the data file over the network 19. The server 14 may send a text message to the content receiver along with the data file. The text message may, for example, instruct the content receiver to play the data file.

In a particular implementation of this method, the server 14 uses the content receiver's contact information and sends an electronic message including the Internet URL link to the content receiver's computing device 20 associated with the contact information. The message then displays on the screen 28. The content receiver may access the media content data file and initiate an online chat session with the content sender by clicking the link.

Clicking the link directs the content receiver's computing device 20 to a webpage that displays the media content data file. The webpage also include a messaging feature allowing the content sender and receiver to send and receive text messages back and forth between their respective computing devices 18, 20.

If the content receiver decides to play the media content data file, the method continues to block 48. At block 48, the file plays over the network 19 at the content receiver's computing device 20.

At block 50, the server 14 monitors over the network 19 the media content data file as the file is playing at the content receiver's computing device 20. This allows the server 14 to know when the trigger event occurs. The server may monitor the data file, for example, by playing the file directly from the server 14, by receiving periodic updates about the play time progress of the data file, and/or by detecting a change in the play status of the data file.

When the server 14 registers that the trigger event occurred, the method continues to block 52. At block 52, the server 14 transmits an electronic notification over the network to the content sender's computing device 18 after the data file reaches the trigger event. The electronic notification is displayed at the content sender's computing device 18 for notifying the content sender of the occurrence of the trigger event.

Figure 3:
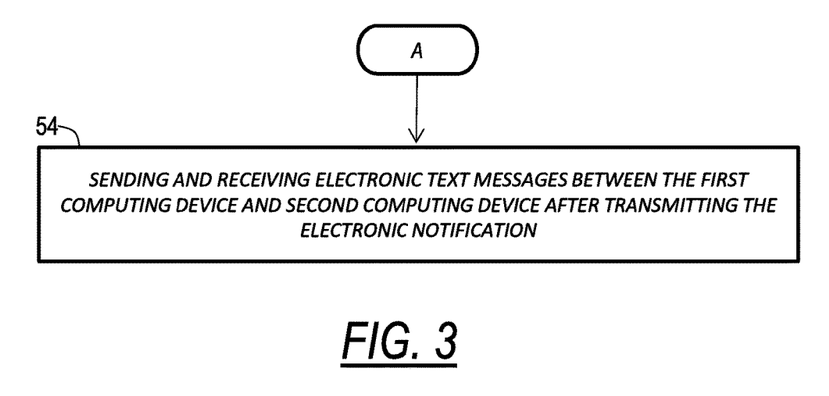
FIG. 3 is a flow diagram illustrating another exemplary step that may be included in the method illustrated in FIG. 2.

Referring now to FIG. 3, the method 40 may continue to block 54. At block 54, the server 14 sends and receives electronic text messages over the network between the content sender's computing device 18 and the content receiver's computing device 20. These messages are displayed in the messaging function of the webpage, allowing the webpage to function effectively as a chat room for the sender and receiver.

Figure 4:
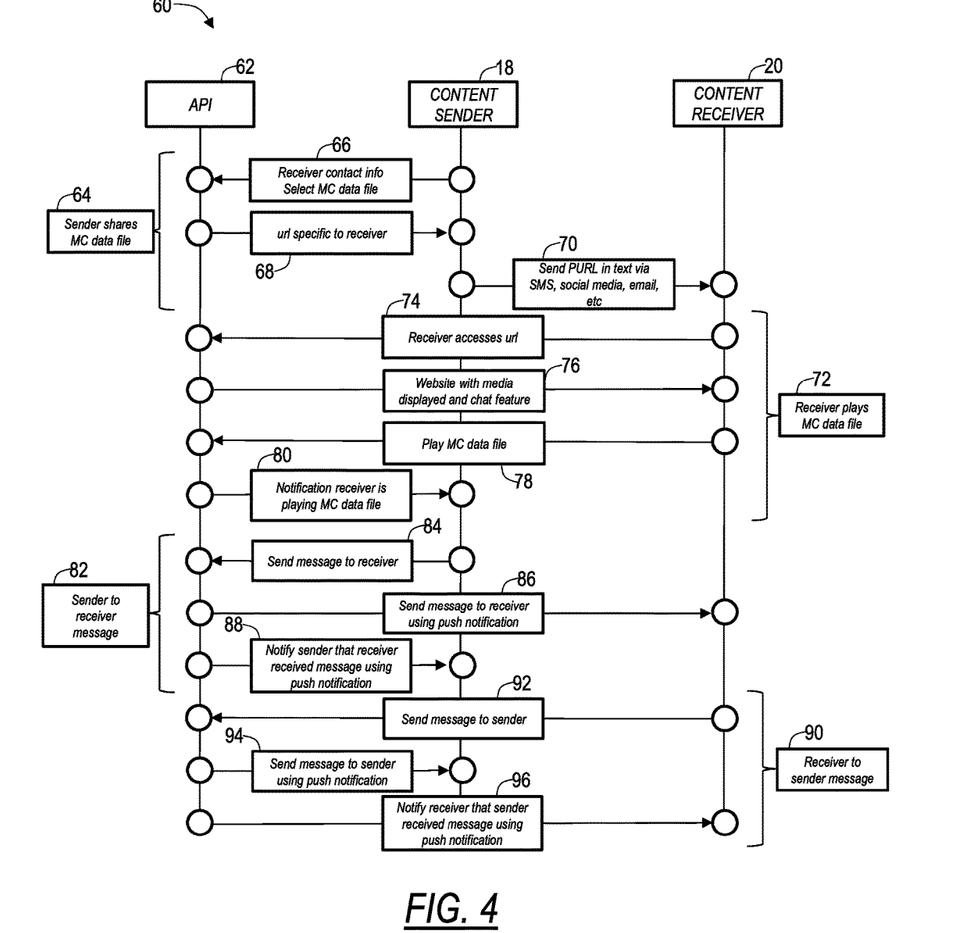
FIG. 4 is a block diagram that illustrates exemplary tasks that may be performed by an application programming interface ("API") when executing program instructions to implement a method for providing a notification upon the occurrence of a trigger event associated with playing media content over a network.

Certain program instructions associated with the method 40 may be further understood by referring to FIG. 4, which is a block diagram that illustrates exemplary tasks performed by an application programming interface ("API") 62 associated with the program instructions, the content sender's computing device 18, and the content receiver's computing device 20.

The API 62 is essentially a set of commands used to build the program instructions to execute the method 40. It expresses program modules in terms of inputs, outputs, and operations. The API is built to interact with the server 14, the content sender's computing device 18, and the content receiver's computing device 20. It is not limited to any particular type of computing device or programming language.

Block 64 indicates operations that take place at the beginning of a session when the content sender shares a media content data file with the content receiver. Initially, the sender uses the content sender's computing device 18 to make the request and identify the content receiver and the data file to share (block 66). The API then generates the Internet URL specific to the content receiver and transmits the URL to the content sender's computing device 18 (block 68). The content sender's computing device 18 subsequently forwards the URL as an electronic message such as text, SMS, MMS, email, or the like to the content receiver's computing device 20 (block 70).

Block 72 indicates operations that take place when the content receiver decides to play the media content data file. At block 74, the content receiver access the URL and the webpage with the media content and messaging feature is displayed at the content receiver's computing device 20 (block 76). The receiver then presses the play button for the data file at block 78 and the server 14 is notified because the play status changed. The server 14 subsequently transmits an electronic message to the content receiver's computing device 18, informing the content sender in real time that the data file is playing (block 80).

Block 82 indicates operations that take place after the trigger event occurs. In the example shown, the trigger event occurs when the media content data file has completed its playing time. At block 84, the content sender inputs a text message into the content receiver's computing device 18, which the server 14 receives at block 86 and sends to the content receiver's computing device 20 as a push notification, for example. The server 14 then sends a push notification to the content sender's computing device 18 indicating that the receiver's computing device 20 received the message (block 88).

Block 90 indicates operations that take place when the receiver sends messages to the sender. At block 92, the receiver inputs a message into the messaging function of the webpage, which is transmitted over the network 19 to the server 14. The server 14 then sends the message to the sender's computing device 18 (block 94). The server 14 may then transmit a push notification to the receiver's computing device 20, indicating that the sender's computing device 18 received the message (block 96).

Figure 5:
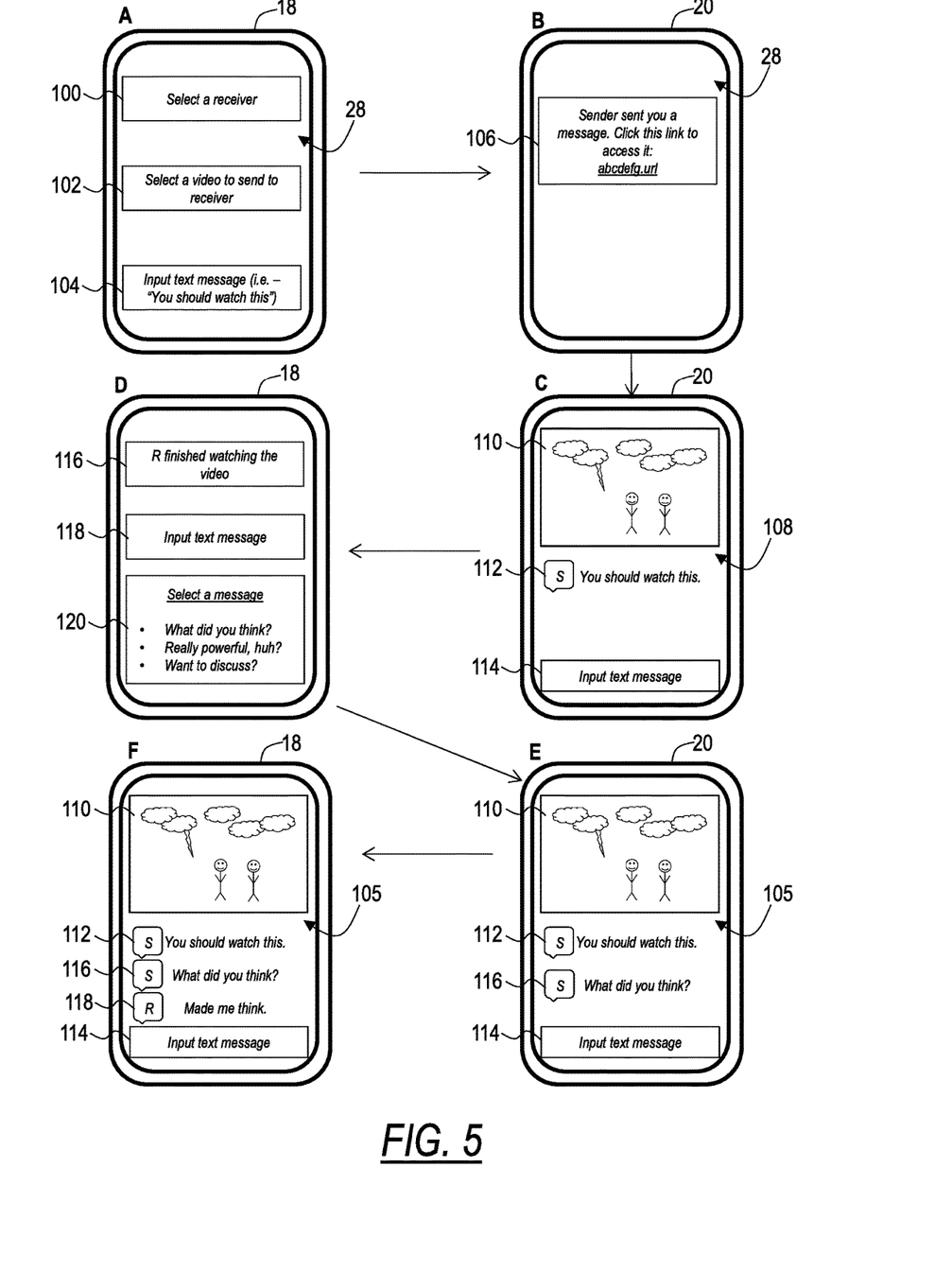
FIG. 5 is a block diagram illustrating content displayed on the content sender's and content receiver's computing devices in an exemplary application of the method.

FIG. 5 illustrates an example of how the method 40 and system 10 may be used by showing what is displayed on the screen 28 of the content sender's computing device 18 and the content receiver's computing device 20. In this example, the media content data file is a video file. Panels A-F show sequential steps.

In panel A, the content sender's computing device 18 displays data fields for selecting a content receiver 100, selecting a video to share with the content receiver 102, and inputting a text message 104 to send along with the video. The server 14 generates a URL unique to the receiver and places the video and text message at the webpage associated with the URL.

In panel B, the server 14 has transmitted an electronic message 106 to the content receiver's computing device 20. The electronic message 106, which is displayed on the screen 28 provides the URL.

The receiver can click the URL to go to the webpage 108. Panel C shows an example of the webpage 108. The webpage 108 displays the video 110 and the text message 112 from the sender "S". It further includes a text data field for allowing the receiver to input text messages 114.

In this example, the trigger event occurs when the video stops playing. When the video stops playing, the server 14 informs the sender. Panel D shows an example of what is displayed on the screen 28 of the content sender's computing device 18 when this happens. A message 116 is displayed, informing the sender that the receiver "R" finished watching the video. The sender can then communicate with the receiver by inputting a follow up message into the text data field 114. The server 14 also displays a list of pre-programmed follow up questions 120 from which the sender can select if desired.

Panel E shows what is subsequently displayed on the content receiver's computing device 20. In this case, the sender's follow up message 116 appears on the webpage.

If the receiver responds to the sender's follow up message, the receiver's message 118 then also appears on the webpage as shown in Panel F.

The computer system 12 may include artificial intelligence programming. The artificial intelligence programming may be a software robot or "bot." The bot may help the sender and receiver to keep their communications going by suggesting content to share based on information such as key words in the text messages, browsing histories, music interests, etc. These data may be retrieved by the bot from the respective computing devices 18,20.

The systems and methods may be used in many contexts where it is desirable to provide a notification upon the occurrence of a trigger event associated with playing media content over a network. This is because it can often be advantageous for the sender of the content to receive the notification to allow the sender to communicate with the receiver in real time just after the trigger event in the media content data file occurs. In this manner, the subject matter of the media content is fresh in the receiver's mind, which would make communications about the subject matter much more impactful than if the sender simply followed up hours or days later.

In a sales and marketing context, for example, a sales person might use the systems and methods to share sales information with a potential customer, then start communicating with that customer as soon as the trigger event occurs.

In a religious context, for example, the sender might use the systems and methods to share religious information with another person, then start communicating with that person about the information very soon after the trigger event occurs. If the religious information has an emotional impact on the receiver, this allows the sender to communicate with the receiver while the receiver is still experiencing the emotional impact.

Examples of embodiments and aspects of the systems and methods have been disclosed, but the scope of possible embodiments and aspects are not limited to these example. The appended claims are not limited to only the particular examples disclosed.

That which is claimed is:

1. A computer-implemented method for providing a notification upon the occurrence of a trigger event associated with playing media content over a network, the method comprising:

(a) receiving, by a server, a request from a first computing device associated with a content sender, the request identifying contact information for a content receiver and a media content data file having a trigger event associated therewith, the trigger event being pre-defined in program instructions on the server;

(b) generating, by the server, a unique URL and corresponding webpage specific to the content receiver, the webpage displaying the media content data file;

(c) transmitting, by the server over the network, the URL to a second computing device associated with the content receiver;

(d) playing, over the network by the server, the media content data file at the webpage on the second computing device while monitoring, by the server in real time, when the trigger event occurs;

(e) transmitting an electronic notification, by the server over the network, to the first computing device contemporaneously with when the server registers that the trigger event occurred, the electronic notification being displayed at the first computing device and notifying the content sender of the occurrence of the trigger event; and (f) sending and receiving electronic text messages input by the content sender into the first computing device and input by the content receiver into the second computing device, by the server over the network, between the first computing device and second computing device after transmitting the electronic notification, the electronic text messages being displayed on the webpage;

wherein the media content data file includes a play time component and the trigger event is a change in play status of the media content data file.

2. The computer-implemented method of claim 1, wherein the server includes a plurality of pre-programmed text messages pertaining to the media content data file and, the method further comprises:

(g) after transmitting the electronic notification, displaying, by the server over the network, the plurality of pre-programmed text messages at the first computing device;

(h) receiving, by the server over the network, instructions from the first computing device to transmit at least one of the pre-programmed text messages to the second computing device; and (i) transmitting, by the server over the network, the pre-programmed text message according to the instructions to the second computing device.

3. A computer system for providing a notification upon the occurrence of a trigger event associated with playing media content over a network, the computer system comprising:

non-transitory memory storing computer program instructions;

at least one processor configured to execute the computer program instructions to:

(a) receive, by a server, a request from a first computing device associated with a content sender, the request identifying contact information for a content receiver and a media content data file having trigger event associated therewith, the trigger event being pre-defined in program instructions on the memory;

(b) generate, by the server, a unique URL and corresponding webpage specific to the content receiver, the webpage displaying the media content data file;

(c) transmit, by the server over the network, the URL to a second computing device associated with the content receiver;

(d) play, over the network by the server, the media content data file at the webpage on the second computing device while monitoring, by the server in real time, when the trigger event occurs;

(e) transmit an electronic notification, by the server over the network, to the first computing device contemporaneously with when the server registers that the trigger event occurred, the electronic notification being displayed at the first computing device and notifying the content sender of the occurrence of the trigger event; and (f) send and receive electronic text messages, by the server over the network, between the first computing device and second computing device after transmitting the electronic notification;

wherein the media content data file includes a play time component and the trigger event is a change in play status of the media content data file.

4. The computer system of claim 3, wherein the memory includes a plurality of pre-programmed text messages pertaining to the media content data file in the memory and the processor is further configured to execute computer program instructions to:

(g) after transmitting the electronic notification, display, by the server over the network, the plurality of pre-programmed text messages at the first computing device;

(h) receive, by the server over the network, instructions from the first computing device to transmit at least one of the pre-programmed text messages to the second computing device; and (i) transmit, by the server over the network, the pre-programmed text message according to the instructions to the second computing device.

5. A server for providing a notification upon the occurrence of a trigger event associated with playing media content over a network, the server comprising:

non-transitory memory storing computer program instructions;

at least one processor configured to execute the computer program instructions to:

(a) receive a request from a first computing device associated with a content sender, the request identifying contact information for a content receiver and a media content data file having a trigger event associated therewith, the trigger event being pre-defined in program instructions on the memory;

(b) generate a unique URL and corresponding webpage specific to the content receiver, the webpage displaying the media content data file;

(c) transmit, over the network, the URL to a second computing device associated with the content receiver;

(d) play, over the network, the media content data file at the webpage on second computing device while monitoring, by the server in real time, when the trigger event occurs;

(e) transmit an electronic notification, over the network, to the first computing device contemporaneously with when the trigger event occurred, the electronic notification being displayed at the first computing device and notifying the content sender of the occurrence of the trigger event; and (f) send and receive electronic text messages, over the network, between the first computing device and second computing device after transmitting the electronic notification;

wherein the media content data file includes a play time component and the trigger event is a change in play status of the media content data file.

6. The server of claim 5, wherein the memory includes a plurality of pre-programmed text messages pertaining to the media content data file and the processor is further configured to execute computer program instructions to:

(g) after transmitting the electronic notification, display, by the server over the network, the plurality of pre-programmed text messages at the first computing device;

(h) receive, by the server over the network, instructions from the first computing device to transmit at least one of the pre-programmed text messages to the second computing device; and (i) transmit, by the server over the network, the pre-programmed text message according to the instructions to the second computing device.

* * * * *